US00RE33990E

United States Patent [19]

Cudini

[11] E Patent Number: Re. 33,990

[45] Reissued Date of Patent: Jul. 14, 1992

[54] METHOD OF FORMING BOX-LIKE FRAME MEMBERS

[75] Inventor: Ivano G. Cudini, Woodstock, Canada

[73] Assignee: TI Corporate Services Limited, London, England

[21] Appl. No.: 565,806

[22] Filed: May 15, 1990

Related U.S. Patent Documents

Reissue of:

[64] Patent No.: 4,744,237
Issued: May 17, 1988
Appl. No.: 46,567
Filed: May 6, 1987

[51] Int. Cl.[5] ..... B21D 22/10

[52] U.S. Cl. ..... 72/367; 72/61; 72/360

[58] Field of Search ..... 72/58, 60, 61, 62, 57, 72/63, 367, 369, 370; 29/421.1

[56] References Cited

U.S. PATENT DOCUMENTS

| | | | |
|---|---|---|---|
| 169,392 | 11/1875 | Wicks | 72/58 |
| 731,124 | 6/1903 | Park | 72/58 |
| 788,119 | 4/1905 | Pope | 72/58 |
| 1,943,560 | 1/1934 | Squires | 72/57 |
| 2,047,296 | 7/1936 | Squires | 72/57 |
| 3,810,302 | 5/1974 | Broers et al. | 72/369 X |
| 4,567,743 | 2/1986 | Cudini | 72/61 |
| 4,730,474 | 3/1988 | Iwakura et al. | 72/61 |

FOREIGN PATENT DOCUMENTS

| | | | |
|---|---|---|---|
| 0001344 | 1/1970 | Japan | 72/57 |
| 57-19114 | 2/1982 | Japan . | |
| 57-165134 | 10/1982 | Japan . | |
| 59-130633 | 7/1984 | Japan | 72/58 |
| 61-227126 | 10/1986 | Japan . | |
| 519593 | 4/1940 | United Kingdom . | |
| 523948 | 7/1940 | United Kingdom | 72/63 |
| 544466 | 4/1942 | United Kingdom | 72/61 |

OTHER PUBLICATIONS

Patent Abstracts of Japan, vol. 11, No. 69 (C-407) [2516] Mar. 3, 1987.

Isachenkov, E. I., Molding by Rubber and Liquid, Mashinostroenie, Moscow, 1967.

*Primary Examiner*—R. L. Spruill
*Assistant Examiner*—Donald Gurley
*Attorney, Agent, or Firm*—Kinzer, Plyer, Dorn, McEachran & Jambor

[57] ABSTRACT

A box-like frame member is formed by compressing an internally-pressurized tubular blank within a die having a cavity conforming to the final box-like cross section desired for the product, and increasing the pressure to exceed the yield limit of the wall of the blank to expand the blank into conformity with the die cavity. The blank is selected so that the final product and the die cavity have a circumference preferably no more than about 5% larger than the circumference of the blank, to avoid weakening or cracking of the blank through excessive circumferential expansion. The internal pressure forces the blank evenly into the corners of the die on closing and allows the blank to be confined within the die without sections of the die pinching the blank on closing of the die.

22 Claims, 2 Drawing Sheets

METHOD OF FORMING BOX-LIKE FRAME MEMBERS

Matter enclosed in heavy brackets [ ] appears in the original patent but forms no part of this reissue specification; matter printed in italics indicates the additions made by reissue.

The present invention relates to a modification of the method of forming box-like frame members which is the subject of U.S. Pat. No. 4,567,743 issued Feb. 4, 1986 in the name Ivano G. Cudini.

In the method described in detail in the above-mentioned patent, a box section frame member having generally opposed and planar side frames is formed from a tubular blank by performing it in a preforming die to deform the side walls of the blank inwardly and thereby form the side walls with inwardly recessed concavely curved side wall portions in areas corresponding to the areas that will form the opposed planar side walls in the final frame member. The deformed [block] *blank* is then placed in a final sectional die having a cavity corresponding to the desired shape of the final frame member and after the die is closed the blank is expanded under internal fluid pressure exceeding the yield limit of the walls of the blank, the walls thus expanding outwardly to conform to the interior of the final die cavity.

The preforming step is required in order to reduce the blank to a compact profile allowing it to be placed in a final sectional die having a die cavity not substantially larger than and preferably no more than about 5% larger in circumference than the initial blank, without the sections of the final die pinching the blank on closing the die sections together. If the blank is expanded by more than about 5% in circumference the blank tends to weaken or crack unless special precautions are taken.

The requirement for a separate preforming step, however, increases the complexity of the method, and requires manufacture and operation of two distinct sets of dies, and transport of the preformed items between the preforming and the final dies.

The inventor has now found that the incidence of pinching results from frictional drag exerted on the blank by the surface of the die cavity. This frictional drag locks the die surface onto the adjacent portions of the blank as the die closes and prevents the blank from slipping laterally into the corner portions of the die cavity. As a result, lateral portions of the blank as seen in cross section tend to be expelled laterally outwardly so that they form a sharply angular portion and become pinched between the mating surfaces of the die sections as these are closed together. Further, the inventor has found that the frictional drag can be overcome by pressurizing the blank with internal fluid pressure less than the yield limit of the wall of the blank before closing the die sections. As the die sections close, the internal pressure as the blank is compressed inwardly in the portions corresponding to the planar opposed side faces serves to cause the wall of the blank to bend evenly into the corners of the die section which can thus be of a shape of cavity corresponding to the desired final section, the wall of the blank thus slipping over the die surface and avoiding the pinching problem above referred to.

The present invention provides a method of forming a box section frame member of which at least an elongate portion is of uniform smoothly continuous cross sectional profile having at least two generally opposed and planar side faces, comprising, providing a tubular blank having a continuously smooth arcuate cross section; positioning the blank between open die sections each having a die cavity portion and a mating surface portion, which die sections in the closed position have the mating surface of each section in mating engagement with the mating surface of each adjacent section and the cavity portions defining a die cavity at least as large in circumference as the circumference of the tubular blank and with a smoothly continuous box section cross sectional profile corresponding to the box section cross sectional profile of the desired final frame member; applying internal fluid pressure to the blank at least sufficient to overcome frictional forces exerted on the blank by the die sections on closing of the die sections and tending to expel the wall of the blank laterally outwardly between adjacent mating surfaces of the die sections and less than the yield limit of the wall of the blank; closing the die sections after pressurizing the blank to deform the blank inwardly in the areas corresponding to the generally opposed planar side faces to and force the blank evenly into the corners of the box section; expanding the blank circumferentially by increasing the internal fluid pressure within the blank above the yield limit of the wall until all exterior surfaces of the blank conform to the die cavity; separating the die sections; and removing the expanded blank from the die.

The invention will now be more fully described with reference to the accompanying drawings which show, by way of example only, one form of method in accordance with the invention.

Figure 1:
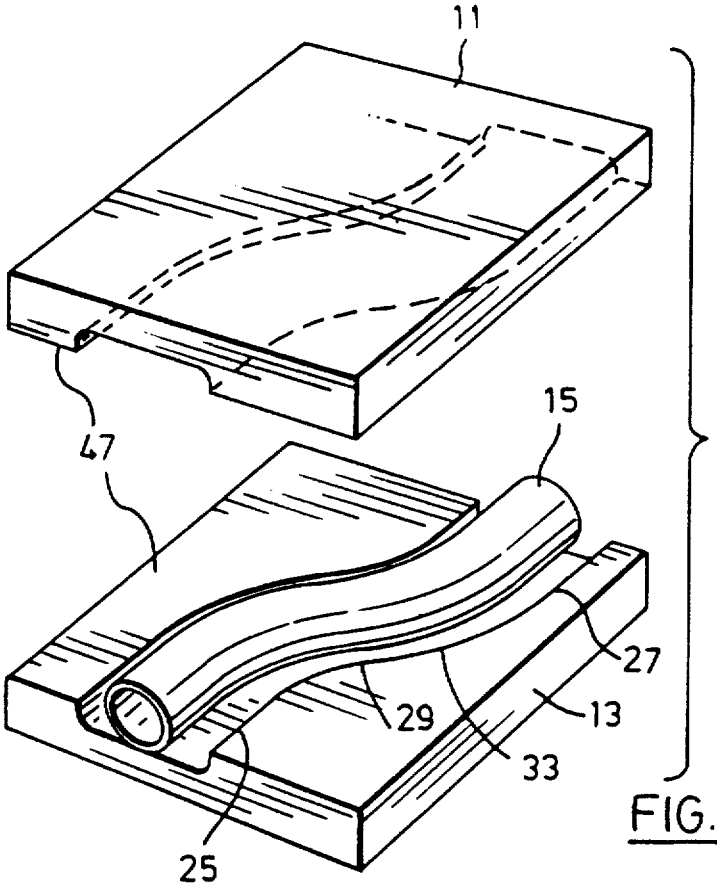
FIG. 1 is a perspective view showing, somewhat schematically, a sectional die and a bent tubular blank for use in the present method.
Figure 5:
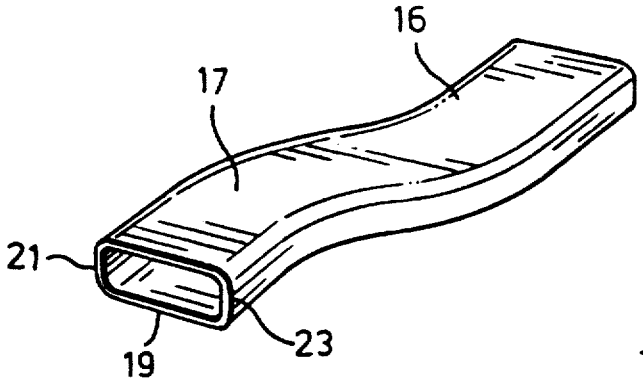
FIG. 5 which appears on the same sheet as FIG. 1, shows a perspective view of the final frame member product.
Figure 4:
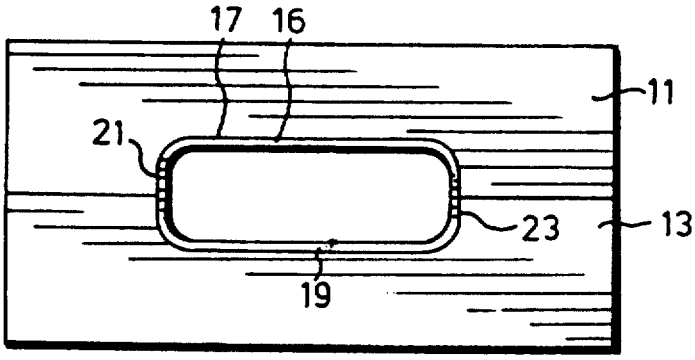

Referring to the drawings FIG. 1 shows an upper and a lower sectional die 11 and 13, respectively, and a bent tubular metal blank 15 which it is desired to form into an approximately rectangular cross section product 16, having throughout the uniform cross section shown in FIG. 4 and comprising relatively long upper and lower planar sides 17 and 19 and planar opposite lateral sides 21 and 23, the sides being interconnected smoothly by rounded corners, as seen in FIG. 4.

It is desired in this example to form a box section frame member 16 of approximately S shape. The upper and lower dies are therefore provided with channel section die cavities of corresponding form, each cavity being uniform along its length and as seen in plan comprising parallel offset opposite end portions 25 and 27, an intermediate portion 29 inclining between the portion 25 and 27 and arcuate elbow portions 31 and 33 connecting between end portion 25 and intermediate portion 29 and between the latter portion 29 and the opposite end portion 27.

Figure 2:
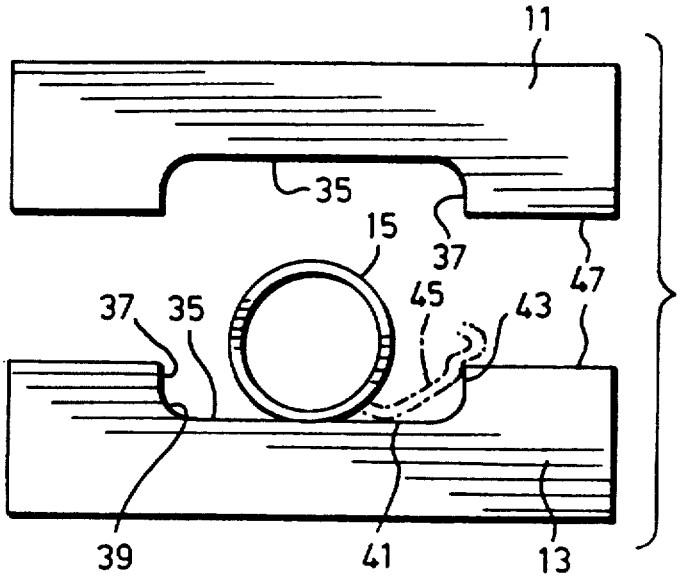
FIGS. 2, 3 and 4 are end views of the dies and blank of FIG. 1 in successive stages of the frame member forming process.

The cavity formed on closing together of the sections 11 and 13 is of uniform cross section throughout its length, and corresponds to the outer surface profile desired for the product shown in FIG. 4. Hence, as best seen in FIG. 2 the channel section cavity in each die section has an approximately planar bottom and in cross section has a cavity consisting of a relatively long linear side segment 35, short linear lateral side segments 37, and rounded corners 39 smoothly continuously connecting the segments 37 and 37.

The staring material cylindrical tubular blank (not shown) is first bent into a shape conforming approximately to the desired S shape of the product frame member, without changing the circumference of the cross section of the tubular blank. In the present case, therefore, the cylindrical blank is first bent into an approximate S shape as seen in FIG. 1, which is of circular section throughout.

The starting material blank is selected so that its circumference is the same as or somewhat less than the circumference of the die cavity formed on closing together the sections 11 and 13, and hence also of the final frame member 16.

Desirably, the circumference of the blank 15 is selected so that the circumference of the product frame member 16 as seen in FIG. 4 is at no point more than about 5% larger than the circumference of the starting material blank 15. At least with the readily available grades of tubular steel, if the blank is expanded in circumference by more than about 5%, there is a tendency for the material of the wall of the blank to excessively weaken or to crack. While expansions of the tube circumference of up to about 20% can be performed if the metal of the tube is fully annealed, it is preferred to conduct the method without employing special pretreatments of the material of the blank, such as annealing. In the preferred form, in order to impart to the blank desired cross sectional profiles without introducing points of weakness, or cracking the wall of the tube, the product frame member 16 has, at all cross sections, a profile with a circumference which is uniform, and is in the range about 2 to about 4% larger than the circumference of the blank 15.

In order to avoid structural weaknesses in the product, it is desirable to select the design of the product so that at all transverse cross sections, the profile is smoothly continuous, and does not include sharp angularities or discontinuities which can give rise to concentrations of stress and can lead to structural weaknesses. Thus, for example, in the product 16 shown in FIG. 4, the sides are joined through gently rounded corner portions, and each of the sides 17, 19, 21 and 23 may themselves be gently convexly curved.

In the method of forming the product 16, the cylindrical blank is first bent into approximately the S configuration of the desired product frame member 16, as noted above, without the blank 15 substantially changing its circumference at any cross section thereof. The bending operation may be performed using conventional bending procedures, for example using internal mandrels and external bending tools, i.e. mandrel bending, or by stretch bending, which employs no internal mandrel. These bending procedures are generally well known among those skilled in the art, and need not be described in detail herein. In mandrel bending, the minimum radius of bend that may be imparted to the tube is approximately twice the diameter of the cylindrical tube blank, and the minimum distance between adjacent bent portions is approximately one tube diameter. With mandrel bending, a cross sectional area reduction of about 5% is usually achieved. Where stretch bending, employing no mandrel, is employed, the minimum bend radius will be approximately 3 times the diameter of the blank, and the minimum distance between adjacent bends will be approximately one-half of the diameter of the blank. Usually, a cross sectional area reduction of about 15% is achieved.

In the case of the member illustrated in the accompanying drawings, it is preferable to use mandrel bending, employing an internal mandrel and external bending tools.

Internal fluid pressure is then applied to the bent blank 15 by sealing its ends and injecting liquid hydraulic fluid through one of these seals to achieve a low internal fluid pressure within the blank. The pressure is selected so that it is below the yield limit of the wall of the blank 15, i.e. is below the pressure which causes the blank to commence to *permanently* swell or expand radially outwardly, but on closing of the die is sufficient to overcome frictional drag exerted by the die sections.

On closing of the die sections, e.g. the sections 11 and 13, the blank 15 is compressively deformed as its upper and lower sides engage the planar sides of the die cavity portions which in cross section provide the linear segments 35. The compression urges the lateral sides of the blank laterally outwardly to a point where a lateral portion of the deformed blank engages a lateral side segment 37 of the die cavity. One quadrant of the deformed blank as it would be in the absence of sufficient internal pressure, is shown in broken lines in FIG. 2, it being understood that the other quadrants of the deformed blank are configured symmetrically with respect to the illustrated portions. As will be seen, the deformed lower side of the blank and the lateral side of the blank engage the ends of the segments 35 and 37 at the zones indicated at 41 and 43, respectively in FIG. 2. Because of the reaction between the die sections 11 and 13 and the blank 15 there is a strong frictional force exerted on the side wall of the blank so that the side wall is effectively locked into contact with the inner surface of the die cavity. As a result, the side wall cannot slide transversely over the inner surfaces of the die cavity to enter the rounded corner 39. On compression of the blank as the die sections close further, the lateral side portion 45 of the blank, between the portions held by frictional zone at the zones 43, is bent outwardly and expelled beyond the envelope which is defined by the die cavities in the closed position.

Figure 3:
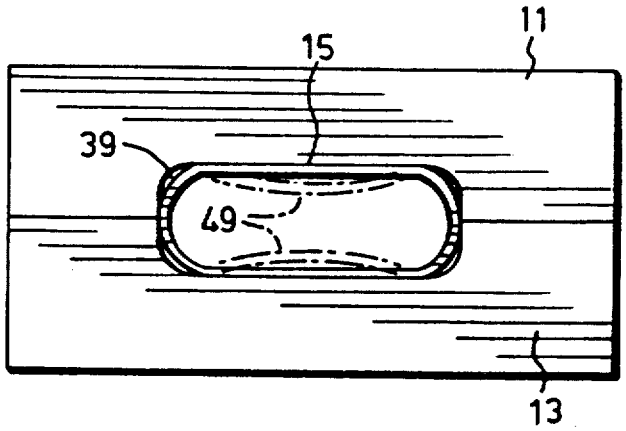

Each die section 11 and 12 has adjacent each side of its die cavity portion a planar mating surface portion 47, these portions being brought into mating engagement along a single plane in the closed position as seen in FIGS. 3 and 4. Hence, as the die closes, the portions 45 expelled laterally from the die cavity become pinched between the portions 47.

In the present method, the blank 15 is internally pressurized so that as the blank is compressed the internal pressure acting on the wall of the blank adjacent the corners 39, where the blank is initially unsupported on its outer side is sufficient to force the wall of the blank evenly into each of the corners 39. As a result the wall of the blank slips transversely over the inner surface of the die cavity, overcoming the frictional force tending to resist such transverse slippage, the wall of the blank being thereby maintained or withdrawn within the envelope defined by the die cavity, and therefore the above noted pinching problem is avoided.

The internal pressure required in order to overcome the frictional force and to form the blank so that it is evenly forced into the corners of the cavity can readily be determined by trial and experiment for given dimensions and configurations of blank and of the die cavity. Typically the pressure will be about 300 psi.

In order to avoid or reduce risk of the compression of the blank causing a rise in the internal pressure sufficient to cause yielding of the wall of the blank, it is desirable to maintain the pressure within the blank below a predetermined limit less than the yield limit of the wall of the tubular blank. This can be readily accomplished by providing a pressure relief valve in one of the above mentioned end seals, the valve being set to release liquid when the pressure rises above a predetermined limit.

Where, as in the preferred form, the circumference of the die cavity is somewhat larger, preferably up to 5% larger, than the circumference of the tubular blank 15, a clearance will remain between the blank 15 and the die cavity, particularly in the corners 39, as seen in FIG. 3. Further, it is found that the reaction between the blank 15 and the die sections 11 and 13 is such that the sides of the blank adjacent the planar sides of the die cavity, i.e. adjacent the linear segments 35 and/or 37, as seen in cross section tend to be bowed or dished inwardly so that they take on a slightly concavely curved configuration as shown exaggeratedly in broken lines at 49 in FIG. 3.

Once the die is closed, the deformed blank can be expanded to final form by applying internal pressure sufficient to exceed the yield limit of the wall of the blank.

The upper and lower die sections 11 and 13 are held together with sufficient force to prevent any movement during the procedure of expansion of the blank to the final form. The expansion procedure produces the cross section illustrated to a very high degree of accuracy, uniformity and repeatability.

After the completion of the expansion step, the pressure is released, the hydraulic fluid is pumped out of the interior of the deformed tube, and the upper and lower die sections 11 and 13 are separated and the final product is removed from the die.

Any material having sufficient ductility to be processed by the method described above can be employed. In the preferred form, wherein the final product has a substantially uniform circumference, which is no more than about 5% larger than the original circumference of the blank, materials such as mild steel can be employed without any special pretreatment such as annealing. In a typical example, a 3½ inch diameter by 0.080 inch wall thickness by 60 inch long tube of SAE 1010 steel was employed, and was formed and expanded to a product having the configuration shown in FIG. 4, the degree of circumferential expansion being about 3%.

Various modifications may be made to the procedure described above. For example, a starting material blank 10 of a smoothly-rounded non-circular cross section, for example of eliptical cross section, may be employed.

In the step of deforming the pressurized blank on closing the die sections there is limited rubbing contact between the surfaces of the blank and the die, but this produces very little wear of the surfaces of the die, so that excellent repeatability of the process is obtained. Further, the die may be formed from relatively soft and inexpensive materials, without requiring any special surface hardening treatments In the preferred form, each die cavity in the die sections 11 and 13 has its side surfaces 37 disposed at slight draft angles. This avoids any tendency for the final product to engage within the die cavity, and permits the final product to be readily removed from the die.

Generally, lubricants do not need to be applied to the surfaces of the blank or to the surfaces of the die sections 11 and 13.

Generally, as in the procedure described above, it is more convenient to bend the blank 15 into conformity with the configuration desired for the final product before deforming and expanding the tubular blank, since this permits bending mandrels and other bending tools which have simply curved surfaces to be employed for engaging and bending the tube blank. It will be appreciated, however, that, where special bending tools having surfaces adapted to conform to the surfaces of the deformed and expanded blank are employed, the bending operation may be carried out after the blank has been deformed and expanded.

I claim:

1. Method of forming a box section frame member of which at least an elongate portion is of uniform smoothly continuous cross sectional profile having at least two generally opposed and planar side faces *and corners*, comprising, *providing a die defined by die sections having open and closed positions*, each having a channel section die cavity portion, a planar mating surface portion and the cavity portion having each channel side extending perpendicular to the mating surface portion, which die sections in the closed position have the mating surface of each section in mating engagement with the mating surface of each adjacent section and the cavity portions defining a die cavity up to about 5% larger in circumference than the circumference of [the] *a* tubular blank and with a smoothly continuous box section cross section profile corresponding to the box section cross sectional profile of the desired final frame member, providing a tubular blank having a continuously smooth arcuate cross section; *the circumference of which is such that forming of said blank to the shape of said die cavity will cause expansion of the circumference of said blank by no more than about 5%;* positioning the blank between open die sections [j] applying internal hydraulic pressure to the blank at least sufficient to overcome frictional forces exerted on the blank by the die sections on closing of the die sections and tending to expel the wall of the blank laterally outwardly between adjacent mating surfaces of the die sections and less than the yield limit of the wall of the blank; closing the die sections after pressurizing the blank to deform the blank inwardly in the areas corresponding to the generally opposed planar side faces and to force the blank evenly into the corners of the box section *profile*; expanding the blank circumferentially by increasing the internal hydraulic pressure within the blank above the yield limit of the wall until all exterior surfaces of the blank conform to the die cavity *and thereby increasing the circumference of the tubular blank by no more than 5%*; separating the die sections; and removing the expanded blank from the die.

2. Method as claimed in claim 1 wherein the bottom of each channel *section cavity* is planar.

3. Method as claimed in claim 1 wherein the die cavity is of uniform cross section throughout its length.

4. Method as claimed in claim 1 comprising bending the tube before placing it between *the* die sections each having a cavity conforming to the bent shape of the tube.

[*5. Method as claimed in claim 1 wherein the circumference of the die cavity is no more than about* 5% larger than the circumference of the tubular blank.]

6. Method as claimed in claim [6] *1* wherein the circumference of the die cavity is about 2 to about 4% larger than the circumference of the tubular blank.

*7. Method of forming a box section frame member of which at least an elongate portion is of uniform smoothly continuous cross-sectional profile having at least two generally opposed and planar side faces and corners, comprising, providing a die defined by die sections having open and closed positions, each having a die cavity portion having in cross section a corner, a planar mating surface portion, which die sections in the closed position have the mating surface of each section in mating engagement with the mating surface of each adjacent section and the cavity portions defining a die cavity up to about 5% larger in circumference than the circumference of a tubular blank and with a smoothly continuous box section cross section profile corresponding to the box section cross-sectional profile of the desired final frame member, providing a tubular blank having a continuously smooth arcuate cross section the circumference of which is such that forming of said blank to the shape of said die cavity will cause expansion of the circumference of said blank by no more than about 5%; positioning the blank between open die sections; applying internal hydraulic pressure to the blank at least sufficient to overcome frictional forces exerted on the blank by the die sections on closing of the die sections and tending to expel the wall of the blank laterally outwardly between adjacent mating surfaces of the die sections and less than the yield limit of the wall of the blank; closing the die sections after pressurizing the blank to deform the blank inwardly in the areas corresponding to the generally opposed planar side faces and to force the blank evenly into the corners of the box section profile; expanding the blank circumferentially by increasing the internal hydraulic pressure within the blank above the yield limit of the wall until all exterior surfaces of the blank conform to the die cavity and thereby increasing the circumference of the tubular blank by no more than 5%; separating the die sections; and removing the expanded blank from the die.*

*8. Method as claimed in claim 7 wherein the die cavity is of uniform cross section throughout its length.*

*9. Method as claimed in claim 7 comprising bending the tube before placing it between the die sections each having a cavity conforming to the bent shape of the tube.*

*10. Method as claimed in claim 7 wherein the circumference of the die cavity is about 2 to about 4% larger than the circumference of the tubular blank.*

*11. Method as claimed in claim 7 wherein the die consists of two die sections.*

*12. Method as claimed in claim 11 wherein each die section has a channel section cavity.*

*13. Method as claimed in claim 12 wherein the bottom of each channel section cavity is planar.*

*14. Method as claimed in claim 13 wherein said channel section cavities define sides, and the bottom of each channel section cavity is substantially perpendicular to its sides.*

*15. Method of forming a box section frame member of which at least an elongate portion is of uniform smoothly continuous cross-sectional profile having at least two generally opposed and planar side faces and corners, comprising, providing a die defined by die sections having open and closed positions, each having a die cavity portion having in cross section a corner, a planar mating surface portion, which die sections in the closed position have the mating surface of each section in mating engagement with the mating surface of each adjacent section and the cavity portions defining a die cavity up to about 5% larger in circumference than the circumference of a tubular blank and with a smoothly continuous box section cross section profile corresponding to the box section cross-sectional profile of the desired final frame member, providing a tubular blank having a continuously smooth arcuate cross section the circumference of which is such that forming of said blank to the shape of said die cavity will cause expansion of the circumference of said blank by no more than about 5%, positioning the blank between open die sections; applying internal hydraulic pressure to the blank less than the yield limit of the wall of the blank, such that as the blank is compressed, the internal pressure acting on the wall of the blank is sufficient to force the wall of the blank evenly into each of the corners defined by said die sections, thereby, maintaining the blank within the envelope defined by the die cavity; closing the die sections after pressurizing the blank to deform the blank inwardly in the areas corresponding to the generally opposed plandr side faces and to force the blank evenly into the corners of the box section profile; expanding the blank circumferentially by increasing the internal hydraulic pressure within the blank above the yield limit of the wall until all exterior surfaces of the blank conform to the die cavity and thereby increasing the circumference of the tubular blank by no more than 5%; separating the dies sections; and removing the expanded blank from the die.*

*16. The method as claimed in claim 15 comprising bending the tube before placing it between the die sections and further providing a die which defines a cavity conforming to the bent shape of the tube.*

*17. Method as claimed in claim 15 wherein the die consists of two die sections.*

*18. Method as claimed in claim 15 wherein each die section has a channel section cavity.*

*19. Method as claimed in claim 18 wherein bottom of each channel section cavity is planar.*

*20. Method as claimed in claim 19 wherein the channel section cavities define sides, and, the bottom of each channel section cavity is substantially perpendicular to its sides.*

*21. The method as claimed in claim 18 wherein said channel section die cavity portion of each die section has each channel side extending perpendicular to the mating surface portion.*

*22. Method as claimed in claim 15 wherein the circumference of the blank is such that forming of said blank to the shape of said elongate portion will result in expansion of the circumference of said blanks by no more than from about 2% to 4%.*

* * * * *